United States Patent [19]

Hall

[11] 4,324,766
[45] Apr. 13, 1982

[54] METHOD OF SEPARATING ISOTOPES OF URANIUM EMPLOYING UO₂(HFACAC)₂·L WITH AN IMPROVED PHOTON EFFICIENCY

[75] Inventor: Richard B. Hall, Clark, N.J.

[73] Assignee: Exxon Research & Engineering Co., Florham Park, N.J.

[21] Appl. No.: 75,155

[22] Filed: Sep. 12, 1979

[51] Int. Cl.³ ............................................ B01D 59/00
[52] U.S. Cl. ............................... 423/3; 204/157.1 R; 204/158 R; 204/158 HE
[58] Field of Search ............... 204/157.1 R, 158 H, 204/158 R

[56] References Cited

U.S. PATENT DOCUMENTS 4,097,384  6/1978  Coleman et al. ............. 204/157.1 R

FOREIGN PATENT DOCUMENTS 2726979 12/1978 Fed. Rep. of Germany ........ 423/19

OTHER PUBLICATIONS

Ambartsumyan, R. V. et al., "Explanation of the Selective Dissociation of the SF₆ Molecule in a Strong IR Laser Field", *JETP Lett.* 23(1):22-5, 1/5/76.

Gower, Malcom C. et al., "Energy Threshold Effects in the Collisonless Dissociation of Polyatomic Molecules by IR Laser Readiation", *App. Phys. Lett.* 30(10):514-6, 5/15/77.

*Primary Examiner*—Deborah L. Kyle
*Attorney, Agent, or Firm*—A. H. Krumholz; R. I. Samuel

[57] ABSTRACT

Methods for separating uranium isotopes are disclosed including irradiating certain uranyl ion-containing compounds with radiation of a wavelength, λ, at which the compounds have a predetermined absorption cross section $\sigma_\lambda$ at a power > kw/cm² times $$\sigma_\lambda / 4 \times 10^{-18} \text{ cm}^2.$$

3 Claims, 1 Drawing Figure

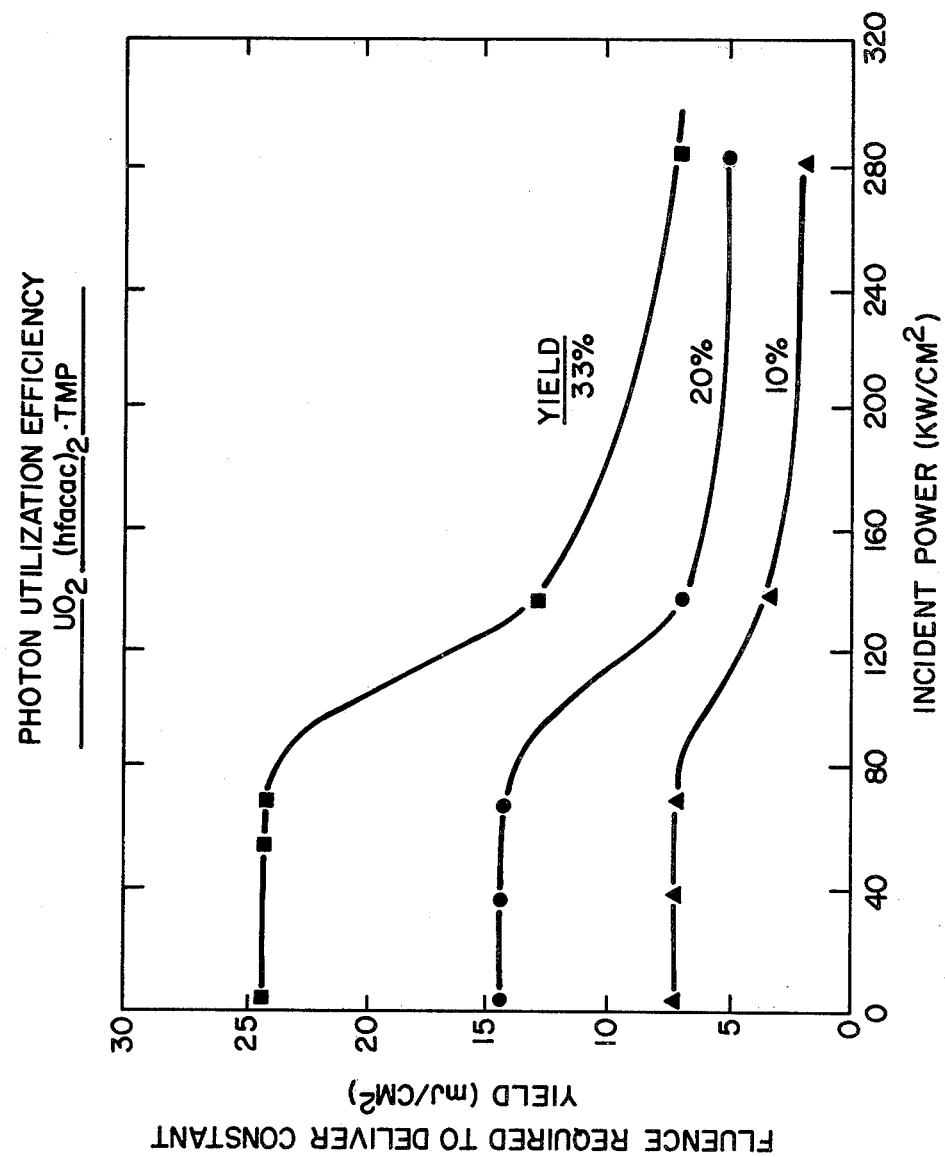

METHOD OF SEPARATING ISOTOPES OF URANIUM EMPLOYING UO₂(HFACAC)₂.L WITH AN IMPROVED PHOTON EFFICIENCY

BACKGROUND OF THE INVENTION

This invention relates to a process for the separation of the isotopes of uranium employing $UO_2AA'.L$ and particularly to such a method having a high photon efficiency.

In U.S. patent application Ser. No. 865,963 which was filed on Dec. 30, 1977 and is entitled "Isotope Separation Process" my co-inventors and I disclose a method for separating isotopes of uranium employing volatile uranyl compounds in combination with a $CO_2$ laser. A plurality of uranyl compounds were specifically disclosed having the formula $UO_2$bis(hexafluoroacetylacetonate)₂.L or $UO_2$(hfacac)₂.L, and the specific example employed therein was $UO_2$(hfacac)₂.THF.

It has generally been thought that dissociation yield was solely a function of fluence once any threshold which exists is exceeded. Thus, it is generally taught in the literature that photon induced dissociation is not power dependent but can occur over wide time periods and the same photon efficiency will result without regard to power.

When photodissociating molecules such as $SF_6$ power dependence is discussed in the literature, since molecules such as $SF_6$ have minimum power thresholds below which no dissociation is observed. It should be noted, however, that once the dissociation power threshold is exceeded, it is generally believed that dissociation yield is a function of photon fluence and is not power dependent.

BRIEF DESCRIPTION OF THE INVENTION

In accordance with the teachings of this invention, it has now been discovered that large molecules such as $UO_2AA'.L$ dissociate at lower photon fluences when higher power pulses are employed. It is believed that the increased photon efficiency of dissociation at higher power levels is a function of energy localization such that energy localized in a particular part of the molecule is able to dissociate the molecule before it is able to equilibrate throughout the molecule.

Therefore the present invention provides a method of separating isotopes of uranium including the step of irradiating a uranyl ion-containing compound having the formula $UO_2AA'.L$ with radiation of a wavelength, at which said uranyl ion-containing compound has a predetermined absorption cross-section $\sigma_\lambda$ at a power greater than 120 kW/cm² times $\sigma_\lambda$ divided by 4 times $10^{-18}$ cm².

DESCRIPTION OF THE DRAWINGS

The sole FIGURE is a plot showing the fluence required to dissociate a predetermined percentage of a volume of $UO_2$(hfacac)₂.trimethylphosphate (TMP) as a function of power incident on such molecule.

DETAILED DESCRIPTION OF THE INVENTION

The method of this invention is practiced in accordance with the teachings in U.S. patent application Ser. No. 865,963 filed on Dec. 30, 1977, and entitled "Isotope Separation Process," which is incorporated herein by reference as though fully set forth herein. In accordance with the present invention the $CO_2$ laser is operated at a higher power density than in the above-mentioned patent application, with the unexpected result that a greater photon efficiency is obtained. In other words, it has been found that a higher power density a molecule will require fewer photons to dissociate.

The uranyl ion-containing molecules which are irradiated in accordance with this invention will have a general formula $UO_2AA'.L$, including such compounds as set forth in pending patent application Ser. No. 961,363 filed on Nov. 16, 1978 in the names of Messrs. Hall, Kaldor, Kramer and Dines, which application is incorporated herein by reference thereto as though fully set forth herein. In particular, these compounds $UO_2AA'.L$ are such that A and A' are anions, and preferably they are highly fluorinated anions, such as $(CF_3CO)_2CH^-$. In any event, the anions A and A', which are preferably the same anions, have a total net charge of $-2$ so that a neutral complex is formed. Furthermore, these compounds include anions and/or ligands (L) which occupy all of the available sites in the first coordination shell of the uranyl ion in order to minimize the intermolecular electrostatic attraction between one uranyl ion and the anions or ligands surrounding another uranyl ion. As for the anions themselves, they may be monodentate or polydentate, and those which are polydentate will form a chelation ring around a portion of the uranyl ion.

Preferable anions for use in connection with the compounds of the present invention will thus include, in addition to the hexafluoracetylacetonate anion discussed above, trifluoroacetylacetonate ($CF_3OCH-COCH_3$), 3-trifluoromethyl-1,1,1,5,5,5-hexafluoroacetylacetonate (($CF_3CO)_2CCF_3$), 3-trifluoroacetyl-1,1,1,5,5,5-hexafluoro-2,4-pentanedionate (($CF_3CO)_3C$), 3-fluoro-1,1,1,5,5,5-hexafluoroacetylacetonate ($CF_3CO)_2CF$), 1,1,1,2,2,3,3,7,7,7-decafluoro-4,6-heptanedionate ($CF_3COCHCOC_3F_7$), as well as fluorinated tropolonates, such as

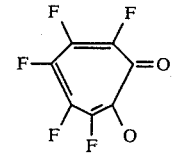

As for the neutral ligands L of the uranyl ion-containing compound for use herein, preferred such neutral ligands include, in addition to the tetrahydrofuran discussed above, isopropanol, ethanol, isobutanol, tert-butanol, ethyl acetate, n-propanol, methanol, acetone, dimethylformanide, trimethylphosphate, pyridine, cyclopentanone, dimethylsulfoxide, acrylonitrile, acetonitrile, tetrahydrothiophene, ethyl ether, and 1,4 dioxane.

Referring now to the sole FIGURE, which shows data for $UO_2$(hfacac)₂.TMP, the fluence required to dissociate such a molecule is constant up to a certain incident power density. It is shown in the FIGURE, however, that above that power density the photon efficiency unexpectedly increases with a resultant decrease in the number of photons required to produce a given yield. Each of the three curves shown in the FIGURE are constant yield curves. That is, the lower curves are the points which result in a 10% dissociation yield; the middle curve are the points that result in a 20% dissociation yield; and the upper curve are the points that result in a 33% dissociation yield of the $UO_2(hfacac)_2.TMP$. Thus, up to approximately 90 kW/cm$^2$ the dissociation yield is not power dependent. Above that value a rapid fall-off occurs, and above 120 kW/cm$^2$ it is apparent that substantially greater photon efficiency is achieved.

Thus, it is clear from the FIGURE that if the method as set forth in the above-mentioned patent application were practiced in accordance with the parameters to the right of 120 kW/cm$^2$ as shown in the FIGURE, an improved photon efficiency will result, so that an improved isotope separation process results.

The measurements which resulted in the data shown in the sole FIGURE employed a CO$_2$ laser on the p(8) transition where the absorption cross-section for $UO_2(hfacac).TMP$ is $4 \times 10^{-18}$ cm$^2$. When either a different molecule is employed, and/or a different laser transition is employed, such that the absorption cross-section is different, the power density above which the improved results occurs is modified by that factor. Thus, in accordance with this invention the power density should be 120 kW/cm$^2$ times the absorption cross-section of the molecule being employed at the frequency of the radiation divided by $4 \times 10^{-18}$ cm$^2$.

It should of course be understood that the pulse width of the radiation will necessarily be decreased as the power density is increased in order to maintain the desired yield. Thus, if the maximum power density is increased without decreasing the time of radiation, the yield will increase and eventually destroy the selectivity.

While this invention has been described with respect to a particular embodiment hereof, it should of course be understood that numerous modifications can be developed without departing from the spirit and scope thereof. In particular, any compound of the formula $UO_2AA'.L$ as set forth above will behave in accordance with the same principles as set forth herein. It is also further believed that other large molecules will show the same power dependence discussed above, but that in all likelihood the power density at which the improved yield will occur will be different for different molecules.

What is claimed is:

1. A method of separating isotopes of U including the step of irradiating a compound having the general formula $UO_2AA'.L$, where A and A' are anions having a total net charge of 2, and L is a neutral ligand, with radiation of a wavelength, $\lambda$, at which said $UO_2AA'.L$ has a predetermined absorption cross section $\sigma\lambda$ at a power $>120$ kw/cm$^2$ times $$\sigma\lambda/4 \times 10^{18} \text{ cm}^2,$$

thereby increasing photon efficiency due to localized energy dissociating the molecule before the energy equilabrates throughout the molecule.

2. The method of claim 1, wherein said compound has the formula $UO_2(\text{hexafluoroacetylacetonate})_2.L$.

3. The method of claim 2, wherein said neutral ligand L is selected from the group consisting of tetrahydrofuan, isopropanol, ethanol, isobutanol, tert-butanol, ethyl acetate, n-propanol, methanol, acetone, dimethylformamide, trimethylphosphate, pyridine, cyclopentanone, dimethylsulfoxide, acrylonitrile, acetonitrile, tetrahydrothiophene, ethyl ether, and 1,4 dioxane.

* * * * *